Jan. 3, 1956 — E. KERN — 2,729,776
ELECTRONIC CONVERTER NETWORK FOR A.C. MOTOR
Filed Jan. 5, 1953
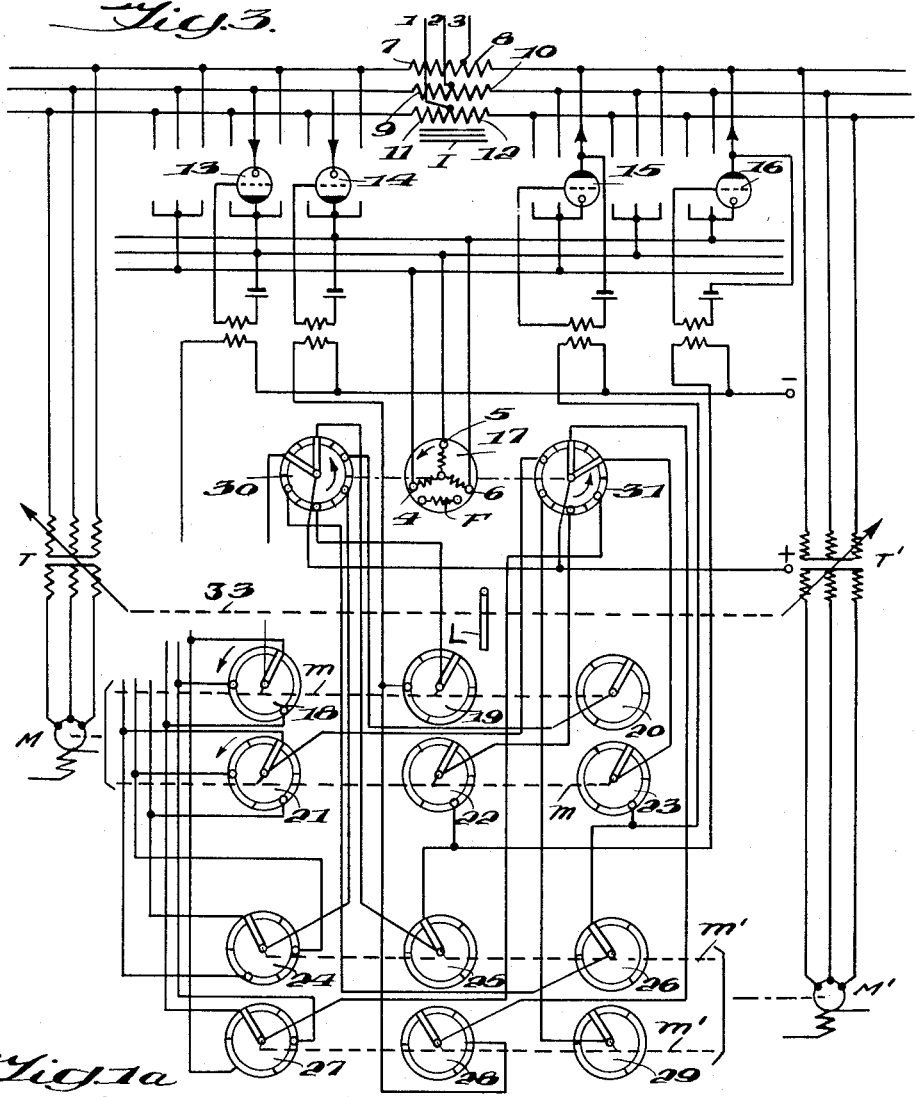
Fig.3.
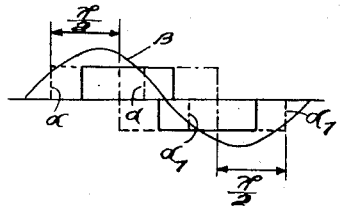
Fig.1a.
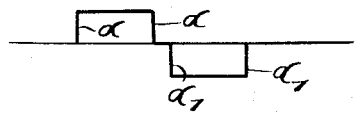
Fig.1b.
Fig.2.
INVENTOR
Erwin Kern
BY Pierce, Scheffler & Parker
ATTORNEYS

# United States Patent Office 2,729,776
Patented Jan. 3, 1956

2,729,776

ELECTRONIC CONVERTER NETWORK FOR A. C. MOTOR

Erwin Kern, Ennetbaden, Switzerland, assignor to Aktiengesellschaft Brown, Boveri & Cie, Baden, Switzerland, a joint stock company Application January 5, 1953, Serial No. 329,680

Claims priority, application Switzerland January 8, 1952

3 Claims. (Cl. 318—138)

This invention relates to electronic converter networks for the operation of direct current motors, and more particularly to converter networks which improve the power factor of the alternating current drawn from the supply lines when the motor is of reversing type and may be operated with regenerative braking.

Installations for feeding direct current motors over two converters are known, of so-called quadruple twin or cross connection type, which permit both regenerative braking and reversing of the direction of motor rotation in a manner similar to the Ward-Leonard system. In the cross connection system, one converter is controlled as a rectifier at any given moment and the other is controlled as an inverter, and the direction of the current in the motor may be reversed arbitrarily at any time without switching in the alternating current supply circuit by interchanging the functions of the electronic converters.

Basically the same system of connections may be employed for the operation of rectified current motors without commutators which correspond in their behavior to direct current motors.

During the speed regulation of direct current motors over controlled rectifiers, the power factor of the supply lines changes in the same way as the rotational speed so that in reversing the motors the mean power factor drops to unsatisfactory values. During the customary natural commutation of the current between the successively ignited anodes of the rectifiers, inductive wattless power is taken from the feeding mains both in driving and in regenerative braking. Connections have been proposed which would permit forced commutation of the current, with application of additional devices, in such a way that the commutation takes place against the direction of the reversing voltage existing between the anodes involved instead of in the direction of the current as it is normally. Forced commutation is characterized in rectifiers by commutation before the reversing voltage passes through zero, and in inverters by commutation after the reversing voltage passes through zero. This corresponds to a loading of the supply lines with capacitative wattless power, or delivery of inductive wattless power to the system. If one-half of the power of a reversing motor could be applied with natural commutation and an inductive loading and the other half with forced commutation and a capacitative loading of the system, the resulting wattless current could be reduced materially and the power factor of the plant could be improved accordingly. The nearest approach to a realization of this aim with commutatorless rectified current motors with a suppressed direct current circuit under prior practice would be to install two complete converter connections in parallel between the terminals of the supply system and the terminals of the motor windings. With a three phase supply system and a three phase winding of the motor, this would require a converter system with at least 36 anodes and 36 discharge gaps, and this would considerably increase the operating costs of the plant.

The present invention affords a solution for this problem of improving the power factor of the system in reversing commutatorless rectified current motors with suppressed direct current circuit, without having to increase the number of discharge gaps. The basic idea of the invention is the exploitation of the possibility of treating in converter connections with suppressed direct current circuit one half wave of the input alternating current in each phase with natural commutation and inductive load, the other half wave with forced commutation and capacitative load of the supply lines.

Objects of the invention are to provide installations for commutating discharge vessels in order to improve the power factor of the supply lines with converter connections, especially for feeding polyphase, commutatorless rectified current motors of reversing type in which each phase terminal of the motor is connected with each phase terminal of the supply lines in counter parallel-connection over two discharge vessels each, one of which is controlled in each case as a rectifier with regard to the supply voltage and as an inverter with regard to the motor voltage, while the other is at the same time controlled as an inverter with regard to the line voltage and as a rectifier with regard to the motor voltage; and in which, from the motor point of view, the current-carrying vessels of the one current direction are commutated with regard to the sign of the reversing voltage of the mains in the opposite way to that of the other current direction.

These and other objects and the advantages of the invention will be apparent from the following specification when taken with the accompanying drawings, in which:

Figs. 1a and 1b are current-time curves for a single phase;

Fig. 2 is a current-time curve or plot for a three-phase supply system; and

Fig. 3 is a fragmentary circuit diagram of an embodiment of the invention.

Fig. 1a shows, how in the commutation of the discharge vessels as intended by the invention, the current in the supply lines is no longer independent, as known, of the rotational speed of the motor but decreases with decreasing motor speed. The curve of Fig. 1b illustrates the resulting instantaneous value of the current in the supply lines, and Fig. 2 the current curve in the three phases of the motor.

With full load on the discharge devices, that is at full motor speed, the dash-lined current curves $\alpha$, $\alpha_1$ of the supply line current are practically in phase with the supply line voltage $\beta$. In order to reduce the motor speed, both current half-waves would be delayed by the timed delay of the control grid pulses in the discharge vessels, if the familiar control method with natural commutation was used, so that both current half-waves $\alpha$, $\alpha_1$ would lag behind the voltage wave $\beta$. The invention makes it possible in connections with a suppressed direct current circuit to advance one current half-wave and to delay the other current half-wave with regard to the voltage wave. The positive current half-wave $\alpha$ is, for example, displaced to the right into the position shown by the solid lines, and the negative current half-wave is displaced to the left into the position marked by the solid lines. So far as the two curves $\alpha$ and $\alpha_1$ overlap, the resulting instantaneous value of the current is zero, as shown in Fig. 1b. It therefore follows that the effective current in the supply lines will be the smaller the greater is the displacement of the two current half-waves from their original position, that is, the smaller the effective voltage on the motor and therefore the lower its speed. The reduction of the effective value of the resulting supply current can be seen from the curve in Fig. 1b, in which the shortening of the length of the current pulses can be seen in relation to the curves α and α₁ of Fig. 1a. In the limiting case when the motor is started up from the standstill with voltage zero, one current half-wave lags behind by 90 degrees, while the other half-wave leads by 90 degrees (see dot-dashed lines in Fig. 1a), and the current in the supply lines equals the total of these currents, that is, is equal to zero.

Fig. 2 shows schematically the current components of the phases RST in the motor circuit; it shows that these current components are equal to the primary current components of a six phase rectifier set. Each phase delivers in the course of a half-wave a practically constant current during a period of 120 electrical degrees, plus the overlapping. Apart from the overlapping, only two phases carry current at the same time, that is, the current flows, with a star connection of the windings, in one winding towards the star point and in the other winding away from it.

In the wiring diagram in Fig. 3, the three phases 1, 2, 3 of the supply lines feeding the motor 17 are connected over the windings 7 to 12 which are on the iron core I of the smoothing reactor, to eighteen discharge vessels of which only four, 13, 14, 15, 16, are illustrated. The eighteen discharge vessels have grid control; they are connected in groups of three adjoining vessels whose anodes are connected to the respective phase leads of the supply lines and whose cathodes are connected to the respective terminals 4, 5 and 6 of the windings of the motor 17.

The motor is provided with a separate field winding F which is energized from a source of direct current, not shown. The several windings of the smoothing reactor are all substantially identical and the pair of windings for each phase may be a single winding tapped at the center for connection to its supply line. The windings are so arranged that direct current portions of the load current magnetize the magnetic circuit in the same sense.

In the vessels 13, 14 which lie on the left side of the smoothing reactor, the current flows from the top to the bottom at a particular moment, and in the vessels 15, 16 to the right of the reactor from the bottom to the top, as indicated by the arrows. At the moment which we are going to consider in the following explanation, the current is supposed to flow from the supply phase 2 over the vessel 13, motor phases 5, 6 and vessel 16, back into the supply phase 3. When the motor takes on electric power, the voltage on the motor is opposite to the current, consequently, terminal 5 is positive towards terminal 6 and the two vessels 13 and 16 work as rectifiers. The control impulses for the control grids of the vessels are fed over rotating contact devices 18 to 31, of which the devices 18 to 29 are synchronized with the motor frequency. The contact devices 30, 31 are each provided with two rotating brushes which may be so adjusted with respect to each other that the contact duration can be extended to 120 electrical degrees. The nine discharge vessels (13, 14, etc.) to the left of the smoothing reactor are controlled, for example, for operation with natural commutation, the nine vessels 15, 16, etc. to the right of the smoothing reactor, however, are controlled for operation with forced commutation. The concept of forced commutation is known in literature (for example, German Patent No. 2,671,651) and is, therefore, not further explained here. Though at the considered moment, the two vessels 13 and 16 are working as rectifiers, they will be controlled differently in the sense that vessel 13 will commutate before the zero voltage instant, whereas the vessel 16, by means of forced commutation, will commutate after the zero passage of the reversing voltage. For this purpose, all the contact devices 18 to 29 which are synchronized with the supply frequency are subdivided into two groups. Within the group 18 to 23 and group 24 to 29, both the fixed contacts and the rotating contact brushes of each of the six contacts have the same position, the fixed contacts of the one group 18 to 23, however, are displaced by 180 electrical degrees compared to those of the other group 24 to 29. Furthermore, the rotating contact brushes of one group are retarded by an arbitrary regulating angle according to the maximum direct current voltage to be developed, while the rotating contact brushes of the other group are advanced by the same angle. The control grid of the vessel 13 is connected with the contact device 18 of one group of converters, and the control grid of the vessel 16 is connected with the contact device 25 of the other group. If the vessels 13 and 16 operate as rectifiers with regard to the supply lines, then the vessel 13 will be controlled with lagging natural commutation, and the vessel 16, however, will be controlled with leading forced commutation. As long as the current enters the terminal 5 of the motor, the two discharge vessels, not shown, adjoining the vessel 13, and which are connected with the supply phases 1 and 3 will operate in cyclic order in the same manner as a three phase rectifier in a Graetz rectifier system, and the same is true, accordingly, of the vessel 16 and its adjacent discharge vessels.

In order to make it possible to perform the transition from driving to braking, and vice versa, at any time and without any switching in the supply circuit or the motor circuit, the converter system includes three discharge vessels to the right of the smoothing reactor which, like vessel 13 and its two adjacent vessels at the left of the smoothing reactor, are also connected between the supply phases and the terminal 5 of the motor 17. In like manner, each group of three converters at the left of the smoothing reactor and connected to motor terminals 4 and 6 respectively, is paralleled by a group of three vessels at the right of the smoothing reactor and connected to motor terminals 4 and 6. At the particular moment under consideration, when the vessel 13 is operating as a rectifier, the associated group of vessels at the right of the smoothing reactor will be operating as inverters and will carry only a small amount of compensating current limited by the smoothing reactor. If the direct current voltage delivered from the supply lines is reduced, however, by shifting a control member of the motor 17 (not shown in the drawing) in preparation for braking the motor, then the current in vessel 13 of the rectifier group on the left side of the smoothing reactor will also decrease, followed by an increase in the current in a vessel of the inverter group to the right of the reactor which is correlated with the rectifier group containing the vessel 13. The current in the motor winding reverses, with the voltage direction unchanged, and now flows in the same direction as the voltage, that is, the motor works as a generator and is braked. In the explanations so far given, it has been assumed that motor terminal 5 is positive with respect to motor terminal 6. After rotation of the motor armature by the electric angle 2π/3, the previously described conditions are established between motor terminals 6 and 4. Due to the simultaneous rotation of the brushes on the devices 30, 31 by the same electrical angle, the brushes of the devices 19 and 26 are energized instead of the brushes of the devices 18 and 25, thus making the vessels 14 and 15 current-conductive. What has been said before about the vessels 13 and 16 is true for all other vessels in cyclic order with the changing phase of the supply voltage. During the regenerative braking of the motor, the controls of all vessels must be changed in such a way that the vessels previously working during the driving of the motor as rectifiers with regard to the supply voltage and as inverters with regard to the motor voltage, now become inverters with regard to the supply voltage and rectifiers with regard to the motor voltage. Since this results in a reversing of the direction of the electric power, while on the other hand, the current direction in the vessels remains the same, the ignition of the vessels would have to take place with reversed voltage, that is, with a displacement of 180 electrical degrees compared to the motor driving operation both with regard to the supply voltage and with regard to the motor voltage. Due to the natural commutation in the operation of the inverters, however, this displacement will be less than 180 electrical degrees, as is well known. Consequently, a second control voltage will have to be applied to the control grid of each vessel which can never overlap or interfere with the other control voltage. Accordingly, the grid of the vessel 13 is controlled not only by a contact of the device 18 but also by a contact of the device 27, which is displaced with regard to the supply frequency by 180 electrical degrees and whose brush is fed by a contact of the device 31 which is also displaced with regard to the motor frequency by 180 electrical degrees. The double brush of the device 31 is displaced compared to that of the device 30 by the double amount of ignition lead necessary in the operation of the inverters to ensure natural commutation with regard to the motor voltage.

In the described control system, half of the current-carrying discharge vessels operate at any given instant with forced commutation so that the desired improvement of the power factor is achieved, due to the additional capacitative load on the supply lines, and without the necessity of doubling the number of the vessels.

The speed and direction of rotation is regulated in the motor in this way, for example, that the contact brushes of the devices 18 to 23 and the devices 24 to 29 are driven each by motors running synchronously with the supply frequency and which are fed each over a variable transformer of which one is rotated in the direction of the rotating field and the other in the opposite direction, and which are ganged for operation by a single control lever.

As shown schematically in Fig. 3, the respective groups of switch devices are driven by synchronous motors M, M' which are energized from the multiphase input lines through circuits which include variable transformers T, T' respectively. The transformers are ganged, as indicated by the broken line 33, by a lever L and, as indicated by the opposite inclination of the arrows which signify adjustability, an adjustment of the lever L effects shifts in opposite sense of the phases of the currents delivered by the respective transformers. The ganging of several switches of the groups for simultaneous operation by motors M and M' is indicated schematically by the broken lines $m$ and $m'$ which connect the switch blades of each group.

The foregoing installation can also be carried out with the same result in such a way that the vessels of one current direction are operated as rectifiers with natural and as inverters with forced commutation, the vessels of the other direction, however, with forced commutation as rectifiers and with natural commutation as inverters. In this case, for example, the vessels to the left in Fig. 3, independent of the energy direction, will constantly commutate with a lag, those of the right side constantly with a lead. The behaviour with regard to the power factor is the same as described above.

The smoothing reactor in Fig. 3 has the function of smoothing the ideal direct currents produced by the vessels and of limiting the short-circuit currents produced during the back ignition.

In the illustrated embodiment, contact devices have been shown to facilitate the understanding of the production of grid control pulses. In practice, connections of the known type will be used without any movable contacts which will give the same results.

I claim:

1. An electronic converter system comprising multiphase alternating current input circuit, a commutatorless rectified current motor having a field winding and a star-connected multiphase driving winding having a section with an outer terminal for each phase of the input circuit, two sets of converter paths in parallel between each motor winding terminal and the respective phases of the alternating current input circuit, oppositely arranged electronic converters in the converter paths of each set, the respective converter including a control grid between a cathode and anode for controlling conduction through the converter, and a control network for commutating one converter of each set as a rectifier with respect to input circuit voltage and as an inverter with respect to motor voltage and commutating the other converter as an inverter with regard to input circuit voltage and as a rectifier with regard to motor voltage, the commutation as viewed from the motor leading the voltage zero for the converters passing current in one direction and lagging the voltage zero for the converters passing current in the opposite direction; said control network including separate groups of ganged switches for supplying grid-ignition voltages in sequence to the several converters in the respective parallel converter paths, separate synchronous motors for driving each of said groups of ganged switches, and separate supply circuits for energizing the respective motors from the input circuit, each supply circuit including an adjustable transformer.

2. The invention as recited in claim 1, in combination with a smoothing reactor comprising center tapped windings for each phase of the alternating current input circuit, the phase lines of the input circuit being connected to the respective center taps, and core means providing a common magnetic circuit for said windings; the windings being so arranged and connected that all direct current portions of the load current magnetize the magnetic circuit in the same sense.

3. The invention according to claim 1, wherein said control network includes means for simultaneously and equally regulating the degree of modulation of the commutation of the converters.

References Cited in the file of this patent

UNITED STATES PATENTS

| | | |
|---|---|---|
| 2,098,182 | Dortort | Nov. 2, 1937 |
| 2,214,563 | Mittag | Sept. 10, 1940 |
| 2,225,360 | Willis | Dec. 17, 1940 |